United States Patent
Wang et al.

(10) Patent No.: US 11,767,427 B2
(45) Date of Patent: Sep. 26, 2023

(54) POLYCARBONATE ALLOY AND PREPARATION METHOD THEREOF AND APPLICATION

(71) Applicant: KINGFA SCI. & TECH. CO., LTD., Guangdong (CN)

(72) Inventors: Peitao Wang, Guangdong (CN); Yin Cen, Guangdong (CN); Xianbo Huang, Guangdong (CN); Nanbiao Ye, Guangdong (CN); Junwei Ai, Guangdong (CN); Jun Wu, Guangdong (CN); Xiangmao Dong, Guangdong (CN); Chao Ding, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 112 days.

(21) Appl. No.: 17/278,659

(22) PCT Filed: Jan. 10, 2019

(86) PCT No.: PCT/CN2019/128148
§ 371 (c)(1),
(2) Date: Mar. 23, 2021

(87) PCT Pub. No.: WO2020/143448
PCT Pub. Date: Jul. 16, 2020

(65) Prior Publication Data
US 2022/0041860 A1 Feb. 10, 2022

(30) Foreign Application Priority Data

Jan. 10, 2019 (CN) .......................... 201910023700.5

(51) Int. Cl.
| | |
|---|---|
| *C08L 69/00* | (2006.01) |
| *C08L 67/02* | (2006.01) |
| *C08K 3/32* | (2006.01) |
| *C08K 5/136* | (2006.01) |
| *C08L 23/12* | (2006.01) |
| *C08L 23/06* | (2006.01) |
| *C08L 51/06* | (2006.01) |

(52) U.S. Cl.
CPC ................ *C08L 69/00* (2013.01); *C08K 3/32* (2013.01); *C08K 5/136* (2013.01); *C08L 23/06* (2013.01); *C08L 23/12* (2013.01); *C08L 51/06* (2013.01); *C08L 67/02* (2013.01); *C08K 2003/324* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 6,455,664 B1 * | 9/2002 | Patel | ....................... C08G 63/80 528/279 |
| 2002/0115792 A1 * | 8/2002 | Verhoogt | ................ C08L 69/00 525/133 |

FOREIGN PATENT DOCUMENTS

| | | | |
|---|---|---|---|
| CN | 101914275 | * | 12/2010 |
| CN | 104270135 | * | 1/2015 |
| CN | 104693745 | | 6/2015 |
| CN | 104693759 | | 6/2015 |
| CN | 104693768 | * | 6/2015 |
| CN | 105860474 | | 8/2016 |
| CN | 106324186 | | 1/2017 |
| CN | 107141752 | * | 9/2017 |
| CN | 107746555 | | 3/2018 |
| CN | 109880336 | | 6/2019 |

OTHER PUBLICATIONS

"International Search Report (Form PCT/ISA/210) of PCT/CN2019/128148", dated Feb. 21, 2020, with English translation thereof, pp. 1-4.

* cited by examiner

Primary Examiner — David J Buttner
(74) Attorney, Agent, or Firm — JCIPRNET

(57) ABSTRACT

The present invention provides a polycarbonate alloy including the following components in parts by weight: 50 parts to 80 parts of a polycarbonate; 1 part to 50 parts of a crystalline polyester; 0.01 part to 4 parts of a maleic anhydride polymer; and 0.01 part to 4 parts of a metal phosphate. The polycarbonate alloy of the present invention has advantages of good alloy stability, and a continuous and uniform distribution of the crystalline polyester in the alloy.

10 Claims, No Drawings

POLYCARBONATE ALLOY AND
PREPARATION METHOD THEREOF AND
APPLICATION

CROSS-REFERENCE TO RELATED
APPLICATION

This application is a 371 of international application of PCT application serial no. PCT/CN2019/128148, filed on Mar. 2, 2020, which claims the priority benefit of China application no. 201910023700.5, filed on Jan. 10, 2019. The entirety of each of the above mentioned patent applications is hereby incorporated by reference herein and made a part of this specification.

BACKGROUND

Technical Field

The present invention relates to the technical field of polymer composites, and in particular relates to a polycarbonate alloy and a preparation method thereof and an application.

Description of Related Art

At present, polycarbonate (PC) is widely used in a production of a variety of industrial and civil parts (such as a variety of transparent parts, lampshades, and instrument panels, etc.). The polycarbonate also has a disadvantage of a poor chemical resistance, so it is difficult to be applied in kitchen appliances, vehicles and other equipments easy to access lampblack. With an improvement of living standards, a demand for the chemical resistance of materials and flame retardancy of polycarbonate materials is more and more severe.

A method to solve the chemical resistance of the polycarbonate is generally to add other crystalline polyester to prepare an alloy, and after the polycarbonate and the crystalline polyester are prepared into the alloy, the crystalline polyester as a discontinuous phase will form an island-like distribution in the polycarbonate, which causes that a filler and an auxiliary agent will selectively dissolve in the polycarbonate or liquid crystal polyester due to different solubilities, resulting in an insufficient performance.

In many application scenarios, a flame retardant needs to be added, but a brominated flame retardant is easy to degrade in a high-temperature preparation process, freeing a bromine element, reducing polycarbonate stability and darkening surface color of materials. Furthermore, the brominated flame retardant often requires an addition of an alkaline metal oxide in order to have flame retardancy, but the alkaline metal salt will destroy the polycarbonate stability. In summary, the brominated flame retardant is very difficult to be applied in light-colored polycarbonate products, so a bromine antimony flame retardant is generally not added in the polycarbonate.

SUMMARY

An objective of the present invention is to provide a polycarbonate alloy having advantages of good alloy stability, and a continuous and uniform distribution of polyester in the alloy.

Another objective of the present invention is to provide a preparation method of the above-mentioned polycarbonate alloy; and an application of a maleic anhydride polymer and a metal phosphate in promoting a continuous and uniform distribution of a crystalline polyester in the polycarbonate alloy.

The present invention is realized by the following technical solutions. A polycarbonate alloy includes the following components in parts by weight:

| | |
|---|---|
| a polycarbonate | 50 parts to 80 parts; |
| a crystalline polyester | 1 part to 50 parts; |
| a maleic anhydride polymer | 0.01 part to 4 parts; and |
| a metal phosphate | 0.01 part to 4 parts. |

Preferably, the polycarbonate alloy includes the following components in parts by weight:

| | |
|---|---|
| the polycarbonate | 50 parts to 80 parts; |
| the crystalline polyester | 1 part to 50 parts; |
| the maleic anhydride polymer | 0.1 part to 2 parts; and |
| the metal phosphate | 0.1 part to 2 parts. |

A polycarbonate resin: the polycarbonate resin of the present invention can be a branched thermoplastic polymer or copolymer obtained by a reaction of dihydroxyl compounds or the dihydroxyl compounds and a small amount of polyhydroxyl compounds with phosgene or dicarbonate. A production method of the polycarbonate resin is not particularly limited, and the polycarbonate resin produced by a phosgene method (an interfacial polymerization method) or a melting method (a trans-esterification method) as known so far can be used. An aromatic dihydroxyl compound is preferably selected as a raw material dihydroxyl compound, and can be exemplified by 2,2-bis(4-hydroxyphenyl) propane (that is, bisphenol A), tetramethyl bisphenol A, bis(4-hydroxyphenyl)-p-diisopropyl benzene, hydroquinone, resorcinol, and 4,4-dihydroxydiphenyl, etc., among which bisphenol A is preferred. A compound in which at least one tetraalkyl phosphonium sulfonate is bonded to the aforementioned aromatic dihydroxyl compound can also be used.

In the aforementioned, the polycarbonate resin is preferably the aromatic polycarbonate resin derived from 2,2-bis(4-hydroxyphenyl) propane, or an aromatic polycarbonate copolymer derived from 2,2-bis(4-hydroxyphenyl) propane and other aromatic dihydroxyl compounds. The polycarbonate resin may also be a copolymer with the aromatic polycarbonate resin as a main composition, for example, a copolymer with a polymer or oligomer containing a siloxane structure. In addition, a mixture of two or more of the above-mentioned polycarbonate resin can be used. A mono aromatic hydroxyl compound can be used to adjust a molecular weight of the polycarbonate resin, such as m-methyl phenol, p-methyl phenol, m-propyl phenol, p-propyl phenol, p-tert-butyl phenol and p-(long-chain alkyl)-substituted phenols.

The present invention has no particular limitation on the production method of the polycarbonate resin, and the polycarbonate resin produced by the phosgene method (the interfacial polymerization method) or the melting method (the trans-esterification method) can be used. The polycarbonate resin can also be provided by subjecting the polycarbonate resin produced by the melting method to a post-treatment for adjusting an amount of terminal hydroxyl groups.

It may be practiced that the crystalline polyester is selected from at least one of polyethylene terephthalate (PET), poly(ethylene terephthalate-co-ethylene adipate)

(PETA), polybutylene terephthalate (PBT), polypropylene terephthalate (PPT), polycyclohexylene dimethylene terephthalate (PCT), polytrimethylene terephthalate (PTT), poly (1,4-cyclohexylene dimethylene terephthalate-co-isophthalate) (PCTA), glycol-modified polycyclohexylene dimethylene terephthalate (PCTG), and glycol-modified polyethylene terephthalate (PETG).

Polyethylene terephthalate (PET) is polyester of terephthalic acid and ethylene glycol, and can be obtained by polycondensation of dimethyl terephthalate with ethylene glycol and polycondensation of terephthalic acid with ethylene glycol. PET may be amorphous (transparent) and semi-crystalline (opaque, white) thermoplastic. Ethylene glycol may be of biological origin, which is mainly corn, sugarcane, wheat and other crop stalks. The polyethylene terephthalate of the present invention may also be modified and synthesized, and a diacid unit may further include aromatic carboxylic acid ester derivatives such as dimethyl isophthalate, dimethyl isophthalate-5-sulfonate, dimethyl phthalate, dimethyl methyl terephthalate, dimethyl naphthalate, and dimethyl biphthalate, aliphatic polyesters such as dimethyl adipate, dimethyl pimelate, dimethyl suberate, dimethyl azelaate, and dimethyl dodecane dicarboxylate, and alicyclic dicarboxylic acid esters such as dimethyl cyclohexane dicarboxylate, dimethyl hexahydro-isophthalate, and dimethyl hexahydro-phthalate. A terminal carbonyl content of the PET may also be controlled, and a content of terminal carbonyl groups may be controlled at a level of 8 eq/ton to 30 eq/ton.

A polybutylene terephthalate resin (PBT resin), which is a main component constituting the polybutylene terephthalate resin composition of the present invention, represents a polymer having a structure in which a terephthalic acid unit and a 1,4-butanediol unit are bonded by an ester bond. Thus, in addition to the polybutylene terephthalate resin (a homopolymer), a polybutylene terephthalate copolymer containing a copolymer component other than the terephthalic acid unit and the 1,4-butanediol unit is included, and also a mixture of such copolymer and the homopolymer is included. The PBT resin may include a dicarboxylic acid unit other than terephthalic acid, and the additional dicarboxylic acid unit may be specifically exemplified by aromatic dicarboxylic acids such as isophthalic acid, phthalic acid, 1,5-naphthylene dicarboxylic acid, 2,5-naphthylene dicarboxylic acid, 2,6-naphthylene dicarboxylic acid, biphenyl-2,2'-dicarboxylic acid, biphenyl-3,3'-dicarboxylic acid, biphenyl-4,4'-dicarboxylic acid, bis(4,4'-carboxyphenyl) methane, anthracenedicarboxylic acid, and 4,4'-diphenyl ether dicarboxylic acid; alicyclic dicarboxylic acids such as 1,4-cyclohexane dicarboxylic acid and 4,4'-dicyclohexyl dicarboxylic acid; and aliphatic dicarboxylic acids such as adipic acid, sebacic acid, azelaic acid and dimeric acids. A glycol unit may include the glycol unit other than 1,4-butanediol, and the additional glycol unit may be specifically exemplified by $C_{2-20}$ aliphatic and alicyclic glycols and bisphenol derivatives. Specific examples are ethylene glycol, propylene glycol, 1,5-pentanediol, 1,6-hexanediol, neopentyl glycol, decylene glycol, cyclohexane dimethanol, 4,4'-dicyclohexyl hydroxymethane, 4,4'-dicyclohexyl hydroxypropane and bisphenol A/ethylene oxide addition glycols. In addition, triols such as glycerol, trimethylolpropane and the like may also be considered.

The maleic anhydride polymer is a maleic anhydride graft polymer with a grafting ratio of 3% to 25%. Preferably, the grafting ratio is 5% to 13%.

The maleic anhydride graft polymer to achieve the objective of the present invention preferably has the relatively high grafting ratio. Generally, maleic anhydride graft polypropylene used as a compatibilizer in a thermoplastic resin has a grafting ratio of about 0.5% to 2%, with a general effect.

When the grafting ratio is higher than 13%, though the alloy stability is continued to improve, dyeing uniformity is decreased instead.

A testing method of the grafting ratio of the maleic anhydride polymer is: titration is used for testing, and the specific method may be the testing method disclosed in Chinese Patent, which publication number is 2016109445762.

A backbone of the maleic anhydride graft polymer may be polyethylene, polypropylene, or the like. A molecular formula of the maleic anhydride graft polypropylene is as follows:

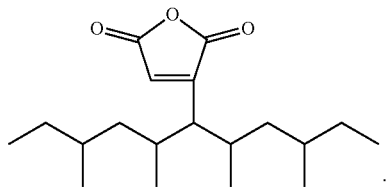 [SMILES: CCC(C)CC(C)C(C1=CC(=O)OC1=O)C(C)CC(C)CC]

The metal phosphate is selected from at least one of sodium phosphate, sodium hydrogen phosphate, sodium dihydrogen phosphate, disodium dihydrogen pyrophosphate, zinc phosphate, calcium phosphate, zinc hydrogen phosphate, and zinc dihydrogen phosphate.

The metal phosphate plays a role of promoting a continuous and uniform dispersion of the crystalline polyester in the polycarbonate alloy in coordination with the maleic anhydride polymer, which cannot be replaced by other metal salts, as experiments shown that a metal oxide or other mineral fillers cannot have similar effect.

A weight ratio of the maleic anhydride polymer to the metal phosphate is 3:1 to 1:2.

In parts by weight, 0 part to 20 parts of a flame retardant is further included. The flame retardant is selected from a compound of a brominated flame retardant and a flame-retardant synergist. The brominated flame retardant is selected from at least one of octabromoether (also known as tetrabromobisphenol A bis(dibromopropyl ether)), decabromodiphenyl ethane, brominated epoxy, brominated polystyrene, brominated triazine, brominated polycarbon, and tetrabromobisphenol A. The flame-retardant synergist is selected from at least one of an antimony compound-containing flame-retardant synergist and a metal borate. In parts by weight, 0 part to 10 parts of an anti-dripping agent is further included.

In parts by weight, 0 part to 10 parts of an auxiliary agent is further included. The auxiliary agent is selected from at least one of an antioxidant, a lubricant, and a weather-resistant agent.

A preparation method of the above-mentioned polycarbonate alloy is characterized by including the following steps: adding the polycarbonate, the crystalline polyester, the maleic anhydride polymer and the metal phosphate according to a ratio into a high-speed mixer to mix evenly, and then adding into a twin-screw extruder for extrusion and granulation, with a screw temperature being 220° C. to 250° C., to obtain the polycarbonate alloy.

An application of a maleic anhydride polymer and a metal phosphate in promoting a continuous and uniform distribution of a crystalline polyester in a polycarbonate alloy, which includes the following components in parts by weight:

| a polycarbonate | 50 parts to 80 parts; |
|---|---|
| the crystalline polyester | 1 part to 50 parts; |
| the maleic anhydride polymer | 0.01 part to 1 parts; and |
| the metal phosphate | 0.01 part to 1 parts. |

The present invention has the following beneficial effects. In the present invention, the maleic anhydride polymer and the metal phosphate are added in a polycarbonate/crystalline polyester alloy, promoting a good dispersion of the crystalline polyester in the polycarbonate, and promoting formation of a microstructure with a uniform dispersion and a continuous distribution (dyeing uniformity is used for evaluation, and the more uniform and continuous the dispersion of the crystalline polyester as a dispersed phase in the alloy is, the more uniform the dyeing is).

The present invention also discovers that the maleic anhydride polymer and the metal phosphate have a good dispersing and stabilizing effect on the flame retardant, especially a brominated flame-retardant system, and ensure long-term flame-retardant stability and alloy stability (reflected in good thermal retention fluidity).

DESCRIPTION OF THE EMBODIMENTS

The present invention is further described by the following embodiments, but the present invention is not limited by the following embodiments.

Sources of raw materials used in the present invention are as follows, but are not limited by the following raw materials.

PBT: polybutylene terephthalate, a crystalline polyester;
PET: polyethylene terephthalate, a crystalline polyester;
maleic anhydride polymer A: a grafting ratio 5% to 6%, a backbone polyethylene;
maleic anhydride polymer B: a grafting ratio 5% to 6%, a backbone polypropylene;
maleic anhydride polymer C: a grafting ratio 11% to 13%, a backbone polyethylene;
maleic anhydride polymer D: a grafting ratio 3% to 4%, a backbone polyethylene;
maleic anhydride polymer E: a grafting ratio 15% to 17%, a backbone polyethylene;
maleic anhydride polymer F: a grafting ratio 0.8% to 1%, a backbone polyethylene;
pigment: red 8206.

A preparation method of a polycarbonate alloy: a polycarbonate, a crystalline polyester, a maleic anhydride polymer and a metal phosphate were added according to a ratio into a high-speed mixer to mix evenly, and then were added into a twin-screw extruder for extrusion and granulation, with a screw temperature being 220° C. to 250° C., to obtain the polycarbonate alloy.

Testing methods for each performance: (1) Dyeing performance test (dyeing uniformity): color quality evaluation: color uniformity of an injection template (2.0 mm) is compared in a same coloring agent system, and a comparison is performed visually. If the color on the template turns uniform, it is judged as excellent; if there are heterochromatic spots on four corners of the injection template, it indicates as general; and if there are long-strip shaped continuous heterochromatic spots on the four corners and a center of the injection template, it indicates not up to standard.

(2) Thermal retention fluidity: after 20 minutes of retention time in a screw barrel with a preset injection temperature being 250° C., and after 20 g of a melt is extruded through a backpressure, a melt index test is performed under a load of 5 kg at 250° C. according to ISO1133 standard. By comparison with calculation results of a normal test process of ISO1133, the greater the increase in the melt index is, the greater the thermal retention fluidity is and the worse the melt stability is.

(3) Flame-retardant class: UL94 standard.

TABLE 1

Ratios (parts by weight) of each component and each performance test results of Embodiments 1 to 10

| | Embodiment 1 | Embodiment 2 | Embodiment 3 | Embodiment 4 | Embodiment 5 |
|---|---|---|---|---|---|
| PC | 70 | 70 | 70 | 70 | 70 |
| PBT | 30 | 30 | 30 | 30 | 30 |
| PET | — | — | — | — | — |
| Maleic anhydride polymer A | 0.01 | 0.1 | 0.15 | 2 | 4 |
| Sodium phosphate | 0.01 | 0.1 | 0.15 | 2 | 4 |
| Lubricant | 0.3 | 0.3 | 0.3 | 0.3 | 0.3 |
| Antioxidant | 0.1 | 0.1 | 0.1 | 0.1 | 0.1 |
| Pigment | 0.4 | 0.4 | 0.4 | 0.4 | 0.4 |
| Dyeing uniformity | A few heterochromatic spots | Uniform color | Uniform color | Uniform color | A few heterochromatic spots |
| Thermal retention fluidity, % | 2.1 | 1.5 | 1.2 | 0.8 | 0.5 |

| | Embodiment 6 | Embodiment 7 | Embodiment 8 | Embodiment 9 | Embodiment 10 |
|---|---|---|---|---|---|
| PC | 70 | 70 | 70 | 70 | 70 |
| PBT | 30 | 30 | 30 | 30 | — |
| PET | — | — | — | — | 30 |

TABLE 1-continued

Ratios (parts by weight) of each component and each performance test results of Embodiments 1 to 10

| | | | | | |
|---|---|---|---|---|---|
| Maleic anhydride polymer A | 0.5 | 0.45 | 0.2 | 0.15 | 0.15 |
| Sodium phosphate | 0.1 | 0.15 | 0.4 | 0.45 | 0.15 |
| Lubricant | 0.3 | 0.3 | 0.3 | 0.3 | 0.3 |
| Antioxidant | 0.1 | 0.1 | 0.1 | 0.1 | 0.1 |
| Pigment | 0.4 | 0.4 | 0.4 | 0.4 | 0.4 |
| Dyeing uniformity | A few heterochromatic spots | Uniform color | Uniform color | A few heterochromatic spots | Uniform color |
| Thermal retention fluidity, % | 3.6 | 2.4 | 3.3 | 3.8 | 1.9 |

TABLE 2

Ratios (parts by weight) of each component and each performance test results of Embodiments 11 to 16

| | Embodiment 11 | Embodiment 12 | Embodiment 13 | Embodiment 14 | Embodiment 15 | Embodiment 16 |
|---|---|---|---|---|---|---|
| PC | 70 | 70 | 70 | 70 | 70 | 70 |
| PBT | 30 | 30 | 30 | 30 | 30 | 30 |
| Maleic anhydride polymer A | — | — | — | — | — | 0.15 |
| Maleic anhydride polymer B | 0.15 | — | — | — | — | — |
| Maleic anhydride polymer C | — | 0.15 | — | — | — | — |
| Maleic anhydride polymer D | — | — | 0.15 | — | — | — |
| Maleic anhydride polymer E | — | — | — | 0.15 | — | — |
| Maleic anhydride polymer F | — | — | — | — | 0.15 | — |
| Sodium phosphate | 0.15 | 0.15 | 0.15 | 0.15 | 0.15 | — |
| Zinc phosphate | — | — | — | — | — | 0.15 |
| Lubricant | 0.3 | 0.3 | 0.3 | 0.3 | 0.3 | 0.3 |
| Antioxidant | 0.1 | 0.1 | 0.1 | 0.1 | 0.1 | 0.1 |
| Color powder | 0.4 | 0.4 | 0.4 | 0.4 | 0.4 | 0.4 |
| Dyeing uniformity | Uniform color | Uniform color | A few heterochromatic spots | A few heterochromatic spots | A few continuous heterochromatic spots | Uniform color |
| Thermal retention fluidity, % | 1.5 | 0.9 | 2.2 | 0.6 | 2.6 | 1.7 |

TABLE 3

Ratios (parts by weight) of each component and each performance test results of Embodiment 17

| | Embodiment 17 |
|---|---|
| PC | 70 |
| PBT | 30 |
| Maleic anhydride polymer A | 0.15 |
| Sodium phosphate | 0.15 |
| Tetrabromobisphenol A | 10 |
| Diantimony trioxide | 2 |

TABLE 3-continued

Ratios (parts by weight) of each component and
each performance test results of Embodiment 17

|  | Embodiment 17 |
| --- | --- |
| Lubricant | 0.3 |
| Antioxidant | 0.1 |
| Color powder | 0.4 |
| Dyeing uniformity | A few heterochromatic spots |
| Thermal retention fluidity, % | 10.1 |
| Flame-retardant class | V-0 |

TABLE 4

Ratios (parts by weight) of each component and each
performance test results of Comparative Examples

|  | Comparative Example 1 | Comparative Example 2 | Comparative Example 3 | Comparative Example 4 | Comparative Example 5 | Comparative Example 6 |
| --- | --- | --- | --- | --- | --- | --- |
| PC | 70 | 70 | 70 | 70 | 70 | 70 |
| PBT | 30 | 30 | 30 | 30 | 30 | 30 |
| Maleic anhydride polymer A | — | 0.15 | — | — | 0.15 | — |
| Sodium phosphate | 0.15 | — | — | 0.15 | — | — |
| Tetrabromo-bisphenol A | — | — | — | 10 | 10 | 10 |
| Diantimony trioxide | — | — | — | 2 | 2 | 2 |
| Lubricant | 0.3 | 0.3 | 0.3 | 0.3 | 0.3 | 0.3 |
| Antioxidant | 0.1 | 0.1 | 0.1 | 0.1 | 0.1 | 0.1 |
| Color powder | 0.4 | 0.4 | 0.4 | 0.4 | 0.4 | 0.4 |
| Dyeing uniformity | Lots of continuous hetero-chromatic spots | Lots of continuous hetero-chromatic spots | Lots of continuous hetero-chromatic spots | Lots of continuous hetero-chromatic spots | Lots of continuous hetero-chromatic spots | Lots of continuous hetero-chromatic spots |
| Thermal retention fluidity, % | 30.2 | 5.3 | 39.8 | 15.2 | 12.3 | 59.6 |
| Flame-retardant class | — | — | — | V-1 | V-1 | V-2 |

It can be seen from Embodiments 1 to 5 that in a preferred dosage (0.1 part to 2 parts of the maleic anhydride polymer and 0.1 part to 2 parts of the metal phosphate), the thermal retention fluidity of the alloy is relatively good and simultaneously the dyeing uniformity is good.

It can be seen from Embodiments 6 to 9 that a ratio of the maleic anhydride polymer to the metal phosphate also has a relatively great influence on alloy stability and dyeing stability. When the weight ratio of the maleic anhydride polymer to the metal phosphate is 3:1 to 1:2, the alloy stability is relatively good and the dyeing uniformity is also relatively good.

It can be seen from Embodiment 3 and Embodiments 12 to 15 that when the grafting ratio is within a range of 5% to 13%, overall alloy stability is the best and the dyeing uniformity is also the best. Generally in a thermoplastic resin, the grafting ratio of the maleic anhydride graft polypropylene as a compatilizer is only 0.8% to 1%, each performance of the product is relatively poor, and especially the dyeing uniformity is general. It can be seen from Embodiment 14 that the higher the grafting ratio is, the better the thermal retention fluidity is, but when the grafting ratio is greater than 13%, the dyeing uniformity is decreased instead.

It can be seen from Embodiment 3 or 17 and Comparative Example 4 or 5 or 6 that a bromine antimony flame-retardant system will seriously reduce the alloy stability and combustion uniformity of the alloy, an addition of the maleic anhydride polymer and the metal phosphate can effectively reduce an effect of the bromine antimony flame-retardant system on alloy performances, and also ensure flame-retardant stability.

It can be seen from Comparative Examples that only a compounding use of the maleic anhydride polymer and the metal phosphate can have advantages of well improving the alloy stability and the dyeing uniformity. When the maleic anhydride polymer or the metal phosphate is added solely, overall performance is poor, which is difficult to satisfy the use.

What is claimed is:

1. A polycarbonate alloy, comprising the following components in parts by weight: a polycarbonate of 50 parts to 80 parts; a crystalline polyester of 1 part to 50 parts; a maleic anhydride polymer of 0.01 part to 4 parts; and a metal phosphate of 0.01 part to 4 parts,
    wherein the metal phosphate is selected from at least one of sodium phosphate, zinc phosphate, and calcium phosphate,
    wherein the maleic anhydride polymer is a maleic anhydride graft polymer with a grafting ratio of 5% to 13%, and the maleic anhydride graft polymer is maleic anhydride graft polyethylene or maleic anhydride graft polypropylene,
    wherein a weight ratio of the maleic anhydride polymer to the metal phosphate is 3:1 to 1:2.

2. The polycarbonate alloy according to claim 1, comprising the following components in parts by weight: the polycarbonate of 50 parts to 80 parts; the crystalline polyester of 1 part to 50 parts; the maleic anhydride polymer of 0.1 part to 2 parts; and the metal phosphate of 0.1 part to 2 parts.

3. The polycarbonate alloy according to claim 1, wherein the crystalline polyester is selected from at least one of polyethylene terephthalate, poly(ethylene terephthalate-co-ethylene adipate), polybutylene terephthalate, polypropylene terephthalate, polycyclohexylene dimethylene terephthalate, polytrimethylene terephthalate, poly(1,4-cyclohexylene dimethylene terephthalate-co-isophthalate), glycol-modified polycyclohexylene dimethylene terephthalate, and glycol-modified polyethylene terephthalate.

4. The polycarbonate alloy according to claim 1, wherein in parts by weight, the polycarbonate alloy further comprises 0 part to 20 parts of a flame retardant; the flame retardant is selected from a compound of a brominated flame retardant and a flame-retardant synergist; the brominated flame retardant is selected from at least one of tetrabromobisphenol A bis(dibromopropyl ether), decabromodiphenyl ethane, brominated epoxy, brominated polystyrene, brominated triazine, brominated polycarbon, and tetrabromobisphenol A; the flame-retardant synergist is selected from at least one of an antimony compound-containing flame-retardant synergist and a metal borate; and in parts by weight, the polycarbonate alloy further comprises 0 part to 10 parts of an anti-dripping agent.

5. The polycarbonate alloy according to claim 1, wherein in parts by weight, the polycarbonate alloy further comprises 0 part to 10 parts of an auxiliary agent; and the auxiliary agent is selected from at least one of an antioxidant, a lubricant, and a weather-resistant agent.

6. A preparation method of the polycarbonate alloy according to claim 1, comprising the following steps:
adding 50 parts to 80 parts of the polycarbonate, 1 part to 50 parts of the crystalline polyester, 0.01 part to 4 parts of the maleic anhydride polymer and 0.01 part to 4 parts of the metal phosphate into a high-speed mixer to mix evenly, and then adding into a twin-screw extruder for extrusion and granulation, with a screw temperature being 220° C. to 250° C., to obtain the polycarbonate alloy.

7. The polycarbonate alloy according to claim 2, wherein the crystalline polyester is selected from at least one of polyethylene terephthalate, poly(ethylene terephthalate-co-ethylene adipate), polybutylene terephthalate, polypropylene terephthalate, polycyclohexylene dimethylene terephthalate, polytrimethylene terephthalate, poly(1,4-cyclohexylene dimethylene terephthalate-co-isophthalate), glycol-modified polycyclohexylene dimethylene terephthalate, and glycol-modified polyethylene terephthalate.

8. The polycarbonate alloy according to claim 2, wherein in parts by weight, the polycarbonate alloy further comprises 0 part to 20 parts of a flame retardant; the flame retardant is selected from a compound of a brominated flame retardant and a flame-retardant synergist; the brominated flame retardant is selected from at least one of tetrabromobisphenol A bis(dibromopropyl ether), decabromodiphenyl ethane, brominated epoxy, brominated polystyrene, brominated triazine, brominated polycarbon, and tetrabromobisphenol A; the flame-retardant synergist is selected from at least one of an antimony compound-containing flame-retardant synergist and a metal borate; and in parts by weight, the polycarbonate alloy further comprises 0 part to 10 parts of an anti-dripping agent.

9. The polycarbonate alloy according to claim 2, wherein in parts by weight, the polycarbonate alloy further comprises 0 part to 10 parts of an auxiliary agent; and the auxiliary agent is selected from at least one of an antioxidant, a lubricant, and a weather-resistant agent.

10. A preparation method of the polycarbonate alloy according to claim 2, comprising the following steps:
adding 50 parts to 80 parts of the polycarbonate, 1 part to 50 parts of the crystalline polyester, 0.1 part to 2 parts of the maleic anhydride polymer and 0.1 part to 2 parts of the metal phosphate into a high-speed mixer to mix evenly, and then adding into a twin-screw extruder for extrusion and granulation, with a screw temperature being 220° C. to 250° C., to obtain the polycarbonate alloy.

* * * * *

UNITED STATES PATENT AND TRADEMARK OFFICE
CERTIFICATE OF CORRECTION

| | | |
|---|---|---|
| PATENT NO. | : 11,767,427 B2 | Page 1 of 1 |
| APPLICATION NO. | : 17/278659 | |
| DATED | : September 26, 2023 | |
| INVENTOR(S) | : Peitao Wang et al. | |

It is certified that error appears in the above-identified patent and that said Letters Patent is hereby corrected as shown below:

On the Title Page

Item (22) PCT Filed Should read: Mar. 2, 2020

Signed and Sealed this
Fourteenth Day of November, 2023

Katherine Kelly Vidal

Katherine Kelly Vidal
*Director of the United States Patent and Trademark Office*